United States Patent [19]

Brown

[11] Patent Number: 5,360,236
[45] Date of Patent: Nov. 1, 1994

[54] APPARATUS AND METHODS FOR MOUNTING AN INERTIAL SENSOR CHASSIS TO AN AIRCRAFT SUPPORT FRAME

[75] Inventor: Harry R. Brown, Buffalo, Minn.

[73] Assignee: Honeywell Inc., Minneapolis, Minn.

[21] Appl. No.: 990,145

[22] Filed: Dec. 14, 1992

[51] Int. Cl.⁵ .................................................. F16M 11/00
[52] U.S. Cl. .................................... 248/672; 248/310; 312/223.1
[58] Field of Search ............... 248/672, 680, 678, 646, 248/220.2, 310, 683, 686, 904, 27.1, 655; 312/223.1

[56] References Cited

U.S. PATENT DOCUMENTS

| | | | |
|---|---|---|---|
| 4,083,620 | 4/1978 | Burgin | 248/551 X |
| 4,363,461 | 12/1982 | Smejkal | 248/655 |
| 4,506,857 | 3/1985 | Hara et al. | 248/655 |
| 4,946,129 | 8/1990 | Eastwick | 248/680 |
| 5,009,385 | 4/1991 | Burgener et al. | 248/310 X |
| 5,018,702 | 5/1991 | Roser et al. | 248/904 X |
| 5,129,594 | 7/1992 | Pease | 248/27.1 X |

FOREIGN PATENT DOCUMENTS

3002433 3/1982 Germany ........................ 248/904

*Primary Examiner*—Karen J. Chotkowski
*Attorney, Agent, or Firm*—Robert A. Pajak

[57] ABSTRACT

An inertial sensor chassis is disclosed. The system includes a support frame including three alignment pins and two planar mounting surfaces. The chassis includes three mating bushing and mating planar surfaces held against the support frame planar mounting surfaces by means of bolts 23 Claims, 6 Drawing Sheets

APPARATUS AND METHODS FOR MOUNTING AN INERTIAL SENSOR CHASSIS TO AN AIRCRAFT SUPPORT FRAME

BACKGROUND OF THE INVENTION

The present invention relates to a method for mounting a chassis to a shelf or rack of an aircraft. More particularly, the present invention relates to mounting an inertial sensor chassis to an aircraft shelf which requires precise alignment relative to the aircraft.

Inertial reference units or inertial navigation units generally include inertial sensors such as accelerometers and gyroscopes, i.e., gyros. The sensors are generally rigidly and precisely mounted to an inertial sensor base which, in turn is precisely mounted within a container, herein referred to as simply a chassis, along with related electronics and hardware. The sensor base is mounted within and to the chassis through suspension mounts or isolators. In turn, the chassis is rigidly and precisely mounted to a support frame of an aircraft. The support frame generally being referred to, in the art, as a shelf or rack of the aircraft. The precision mounting of these components is required so that the alignment of the sensor base relative to the support frame is known and the sensor outputs are utilized by a navigational system computer as is well known in the art.

As is well understood in the art, the navigational system generally includes a plurality of inertial sensors and a navigational computer. The inertial sensors provide inertial data, such as linear acceleration and rotational velocity or angular information, to the navigational computer which processes the information for either flight control and/or navigation. For proper performance of a navigational system, the geometrical relationship between each of the inertial sensors must be known, and the relationship between each of the inertial sensors and the aircraft support frame must also be known so that the navigational computer may provide a pilot with correct navigational information so that the pilot achieves the intended destination, and/or flies the aircraft "by wire".

For optimum performance of inertial reference systems or inertial navigation systems, precise alignment or orientation of the inertial sensor chassis relative to the aircraft must be known and held to tight tolerances. Commonly, the inertial sensor assembly and chassis are manufactured under optimum conditions, and therefore precise alignment of inertial sensors relative to the chassis is known. In turn, the chassis is generally delivered to the aircraft manufacturer or to an airline maintenance operation for installation. In the latter, the maintenance operation commonly will replace inertial reference units or inertial navigational units in accordance with regular maintenance schedules or as required due to system failures. This, of course, means that the inertial sensor chassis needs to be removed from the aircraft support frame and replaced with another inertial sensor chassis while maintaining proper alignment of the newly mounted chassis onto the aircraft support frame.

Accordingly, the inertial sensor chassis mounting system should provide (i) ease of installation and removal of the chassis onto the aircraft shelf, (ii) precision of alignment of the chassis relative to the aircraft shelf, (iii) repeatability of the precision alignment even with multiple repeat installations and removals, (iv) rugged support of the chassis in the aircraft shelf during acceleration loads, shock and vibration while maintaining precise alignment of the chassis during these environments, and (v) include electrical grounding and bonding of the chassis to the aircraft shelf.

In the prior art, a plurality of alignment pins and swing bolts were utilized to secure the inertial reference or navigational unit to the aircraft shelf. However, the prior art system, as will be briefly described below, resulted in imprecise yaw alignment and other deleterious effects due to the technique of swing bolts utilized to fasten the system to the aircraft shelf.

A "swing bolt" inertial sensor chassis mounting system of the prior art generally comprised the use of two rear mounted support frame alignment pins, one front mounted support frame alignment pin, three mating chassis bushings, and two front support frame hold down swing bolts. The two rear alignment pins, one round pin and one diamond shaped cylindrical pin, establish pitch alignment of the chassis relative to the aircraft support frame. A round front mounted alignment pin in combination with the rear mounted round alignment pin established both the roll and yaw alignment of the chassis relative to the support frame.

In the swing bolt mounting system, a pair of swing bolts are generally swung from the aircraft support frame and grab an ear-like member at each front corner of the chassis. In turn, a nut or bolt was threaded to force the chassis against the air frame by virtue of the force applied between the corner of the chassis and the other end of the swing bolt mounted to the aircraft support frame.

With the Swing bolt mounting system of the prior art, pitch, roll, and yaw alignment are provided by the two rear and one front alignment pins. The swing bolts provide the feature of holding the front of the chassis down on the top of the front alignment pin, only. With use of preloaded mating bushings for the rear of the chassis, the rear of the chassis is held down on top of the rear alignment pins. Pitch and roll alignment are provided by the top surfaces of the two rear alignment pins together with the top surface of the front alignment pin; and the yaw alignment is provided by the left and right side surfaces of the front alignment pin and the one rear round alignment pin. Therefore, since the yaw alignment is provided by the position of the one rear alignment pin and the front alignment pin in the bushings of the chassis, the accuracy and repeatability of the alignment is determined by how well the pins fit in the bushings.

Of course, there is always some small clearance between the outside diameter of the alignment pins on the shelf and the inside diameter of the mating bushings on the chassis. This is so to avoid the possibility of physical interference which, of course, would prevent installation of the chassis Since there must be some clearance between the alignment pin diameter and the chassis bushing diameter as aforesaid, the resulting clearances results in uncertainty and non-repeatability of the yaw alignment in the swing bolt mounting system. On the other hand if the tolerances are held extremely small, the chassis may not be able to be installed. To repeat, if the pin-to-bushing fit is too loose, the yaw alignment is not as good; if the pin-to-bushing fit is too tight, the chassis may not be able to be installed.

Another disadvantage of the "swing bolt" inertial sensor chassis mounting system of the prior art is that swing bolt mounting applies force at an angle to the bottom plane of the chassis relative to the support frame of the aircraft. Therefore, the force from these two swing bolts can force bending of the chassis. Since the swing bolts are not usually tightened simultaneously, nor to the same force, an uneven force may be applied to the front chassis corners, which in turn may cause uneven bending of the chassis. This uneven bending or distortion of the chassis may result in distortion of the precise known alignment of the inertial sensors relative to the chassis. Since this uneven tightening of the swing bolts is not repeatable from one unit to the next, the alignment of the chassis relative to the aircraft support frame may vary as the chassis is replaced on the aircraft thereby contributing to non-repeatable and varying sensor alignment errors. This is so, since uneven tightening of the swing bolts can distort the chassis so that the front end of the chassis can twist slightly relative to the rear of the chassis. This potential distortion is dependent on the stiffness of the chassis and the difference in force between the left and right swing bolts. Any distortion of this type would result in a pitch alignment shift for a swing-bolt-mounted chassis which is oriented with the long axis of the chassis perpendicular to the long axis of the aircraft. Another consideration which can affect yaw alignment is that the threaded rod of the swing bolts will tend to stretch like a spring when the bolt is tightened causing yaw misalignment, and subsequent vibration may lead to further yaw misalignment.

Another disadvantage of the swing bolts inertial sensor mounting system is that they do not provide much resistance to sideways movement of the chassis on the shelf. This is so because the swing bolts are free to generally pivot from side to side. This too can cause inertial sensor alignment errors which may result in navigational computer output errors as the result of the chassis movement.

SUMMARY OF INVENTION

An object of the present invention is to overcome the deficiencies of prior art mounting systems for mounting an inertial sensor chassis to an aircraft support frame.

An object of the present invention is to provide a chassis mounting system which avoids the deleterious effects of bending or distorting an inertial sensor chassis while securely supporting the chassis to the support frame, thereby maintaining precise alignment of the chassis relative to the aircraft support frame.

Another object of the present invention is to provide a reliable and precise alignment of the chassis relative to the aircraft support frame for multiple repeat installations and removals of a chassis to and from a support frame.

Another object of the invention is to provide precise alignment of the chassis relative to the aircraft support frame during vibration inputs.

Another object of the present invention is to provide precise and repeatable yaw alignment of the chassis to the support frame.

The present invention provides a precise alignment of an inertial sensor chassis relative to an aircraft support frame. In the preferred embodiment of the invention, the aircraft support frame is provided with first and second frame mounting members each having a frame planar mounting surface being substantially parallel to the yaw axis of the support frame. Three frame alignment pin members are provided which extend from the support frame, generally parallel to each other, and extend in a direction substantially perpendicular to a plane passing through the yaw axis. The alignment pins are spatially located such that the three alignment pin members establish both a pitch and roll reference plane. The inertial sensor chassis includes first and second chassis mounting members each having a chassis planar mounting surface, and in which each of the chassis planar mounting surfaces are positioned to be substantially in parallel with the yaw axis of the chassis, and when placed on the aircraft support frame make planar contact with the frame planar mounting surfaces. Further, the chassis includes first, second, and third alignment pin receiving structures comprising bushings which are configured for mating with the first, second, and third frame alignment pin members.

With the inertial sensor chassis mounting system as just described, the chassis is first placed on the aircraft shelf such that the support frame alignment pin members are coarsely mated with the chassis alignment pin receiving structures. Subsequently, the chassis is pushed toward the rear of the aircraft shelf aligning the rear chassis alignment pin receiving structures with the rear alignment pin members, to thereby allow all of the alignment pin members to mate with the alignment pin receiving structures with sufficient freedom to allow the chassis planar mounting surface to make planar contact with the corresponding support frame planar mounting surfaces. In turn, the chassis and frame planar mounting surfaces are rigidly fixed together by fastening means such as bolts.

The aforesaid chassis mounting system as just described overcomes the disadvantages of the prior art in a manner which provides precise alignment of the inertial sensor chassis relative to the aircraft support frame, particularly in a manner yielding precise yaw alignment, precise pitch and roll alignments, minimal chassis distortion, and permits reliable and repeatable chassis installations.

DETAILED DESCRIPTION OF THE PREFERRED EMBODIMENTS

Figure 1:
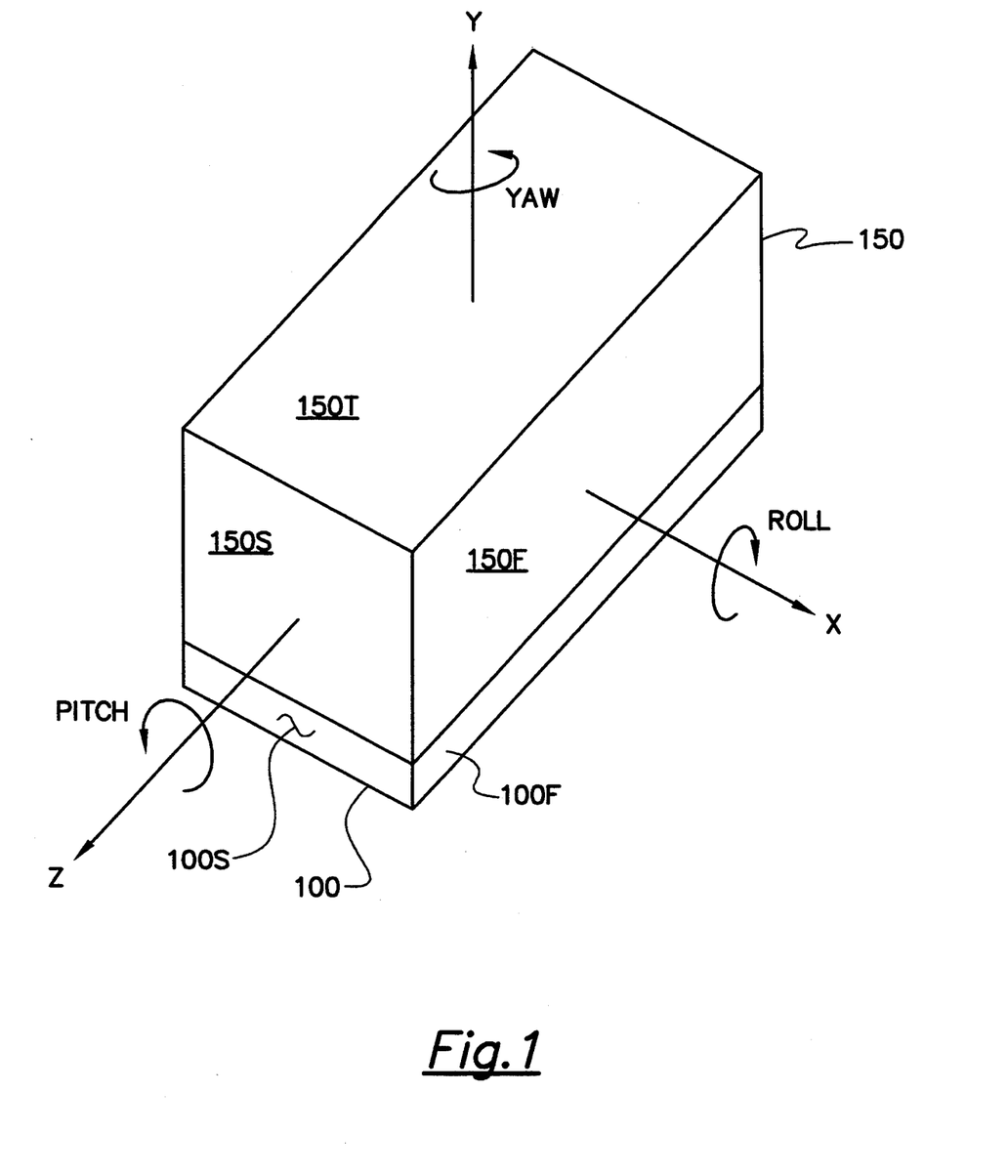
FIG. 1 is a diagrammatic representation showing the inertial reference axes of an inertial sensor mounting system.

FIG. 1 illustrates the intended function of the present invention. More specifically, thereshown is an aircraft support frame 100, having associated therewith first, second, and third mutually orthogonal reference axes, and an inertial sensor chassis 150 mounted thereto. For exposition purposes, the yaw axis is defined to be perpendicular to the top face 150T of chassis 150 and also the top face 100T of support frame 100, the roll axis is defined to be perpendicular to the front face 150F of chassis 150 and 100F of support frame 100, and the pitch axis is defined to be perpendicular to the side face 150S of chassis 150 and also the side face 100S of support frame 100. In the ideal situation, the roll, pitch, and yaw axes of the inertial sensor chassis including the inertial sensors (not shown) are aligned with the reference axes associated with the support frame.

Figure 2:
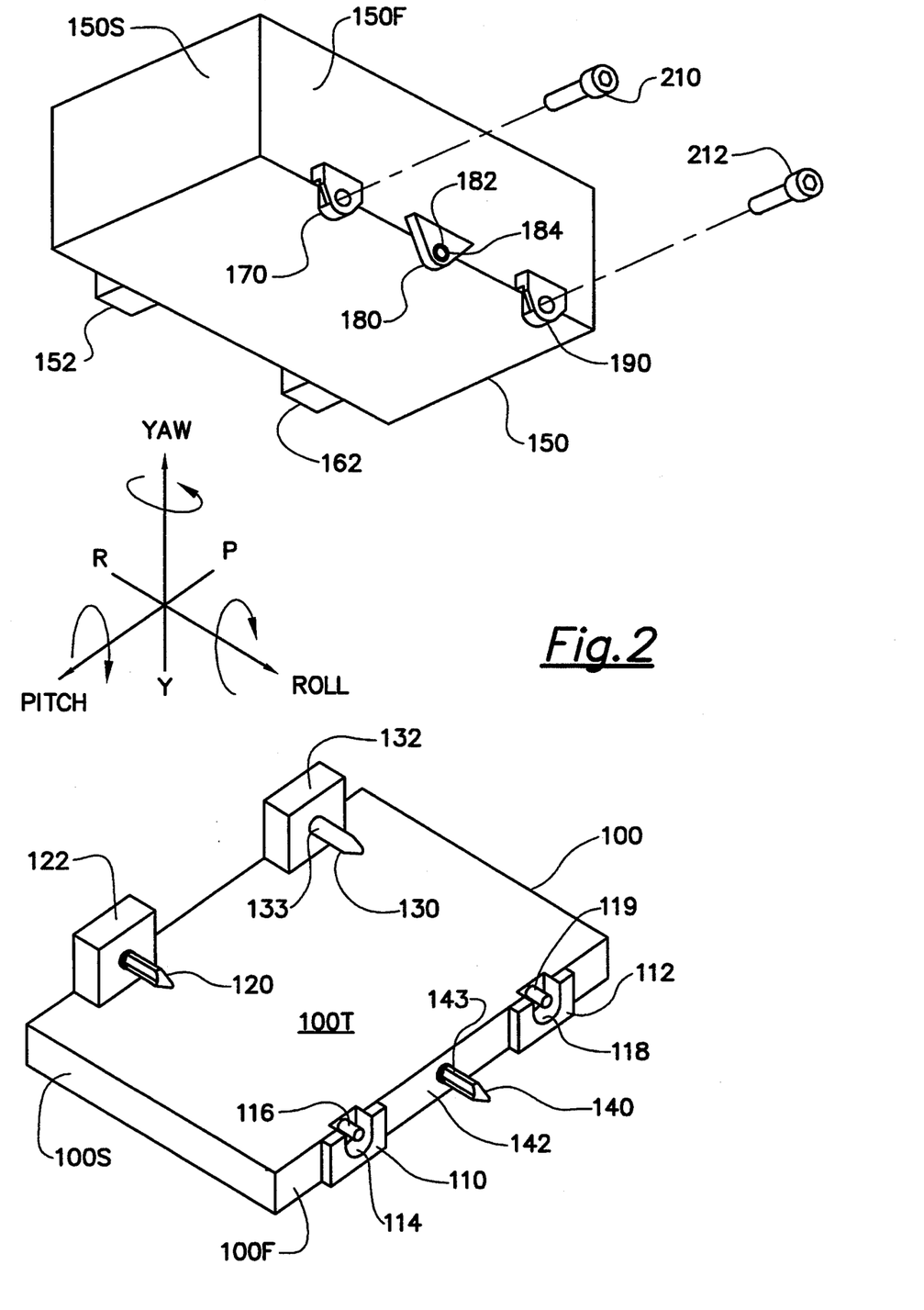
FIG. 2 is an isometric view showing the preferred embodiment Of the invention.
Figure 3:
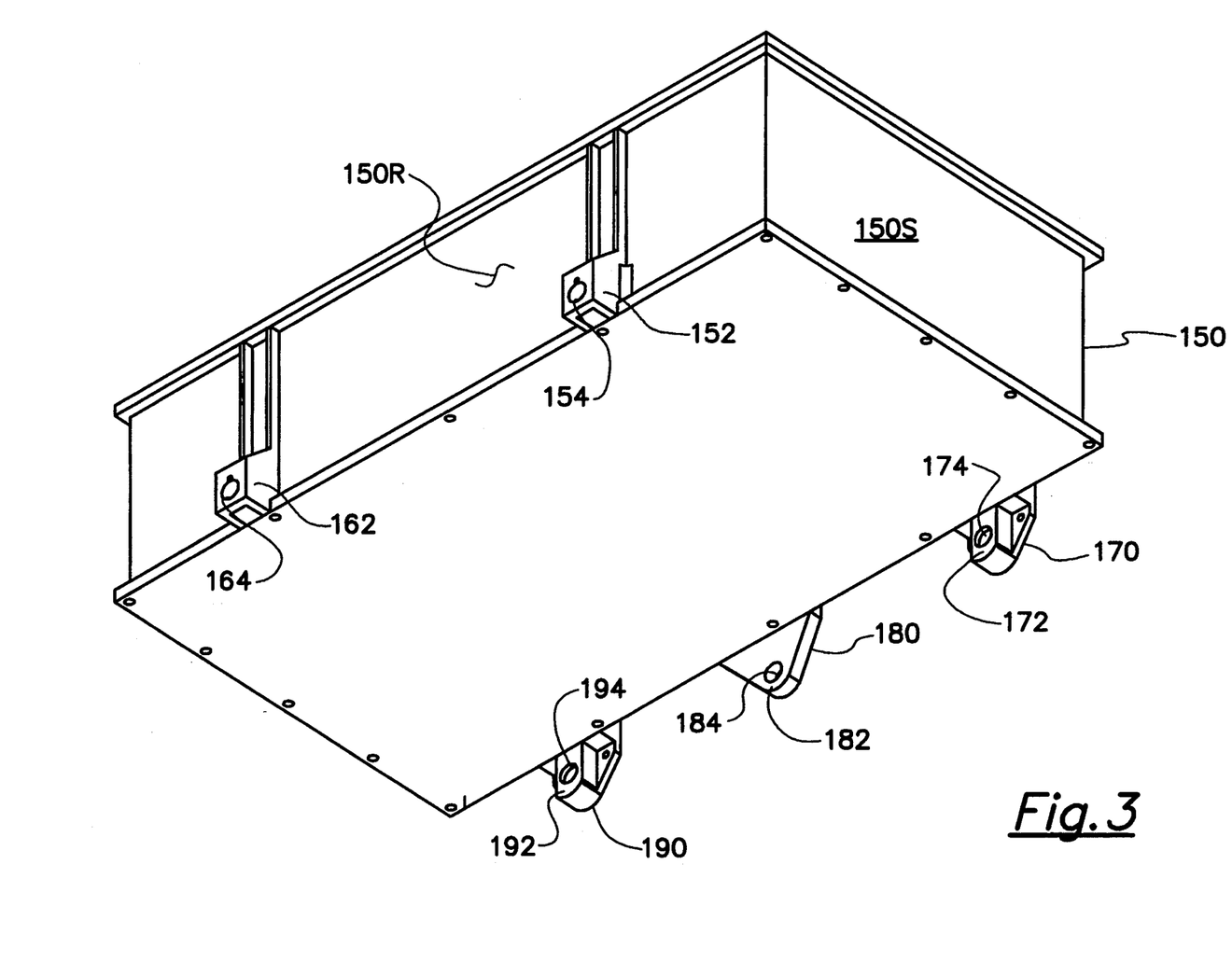
FIG. 3 another isometric view showing in more detail the chassis illustrated in FIG. 2.

FIGS. 2 and 3 illustrates the inertial sensor chassis mounting system in accordance with the present invention. There shown are isometric views of support frame 100 and inertial chassis 150 similar to FIG. 1, except in a separated state. For purposes of this discussion, it is assumed that the support frame 100 is rigidly affixed to the aircraft.

Support Frame

Support frame 100 includes frame planar mounting surfaces 110 and 112 intended to be in parallel with the plane formed by the yaw axis and pitch axis of the aircraft. In the preferred embodiment of the invention particularly illustrated in FIG. 2, support frame planar mounting surfaces 110 and 112 are illustrated as co-planar mounting surfaces defining a plane which is in parallel with the yaw axis and perpendicular to the roll axis of the aircraft.

Support frame 100 also includes three alignment pin members 120, 130, and 140 extending from frame members 122, 132, and 142, respectively. In the preferred embodiment of the invention, alignment pin members 120, 130, and 140 are intended to be substantially in parallel with the roll axis of the support frame.

For purposes of understanding the present invention, each of the alignment pin members 120, 130, and 140 is illustrated as extending from reference points 123, 133, and 143, respectively, at the uppermost interface of the alignment pin member and corresponding support frame member. In the preferred embodiment of the invention as illustrated in FIG. 1, the alignment pin members are also perpendicular to frame planar mounting surfaces 110 and 120, although frame planar mounting surface need not be perpendicular to the frame alignment pin members.

It should be appreciated that the uppermost regions of the parallel alignment pin members 120 and 130, including points 123 and 133 define a reference plane. Further, points 123 and 133, and the perpendicular projection of point 143 of alignment pin member 140 onto the reference plane define a triangle, thereby defining a "roll-pitch" plane. In the preferred embodiment of the invention as illustrated in FIG. 1, the roll axis and pitch axis define a plane in parallel with the aforementioned roll-pitch plane, and the yaw axis being perpendicular thereto.

Support frame 100 further includes apertures 114 and 118 from which extend threaded studs 116 and 119 extending in parallel with the alignment pin members. Studs 116 and 119 are intended to provide a mechanism for mounting chassis 150 thereto as will be subsequently described.

Figure 4:
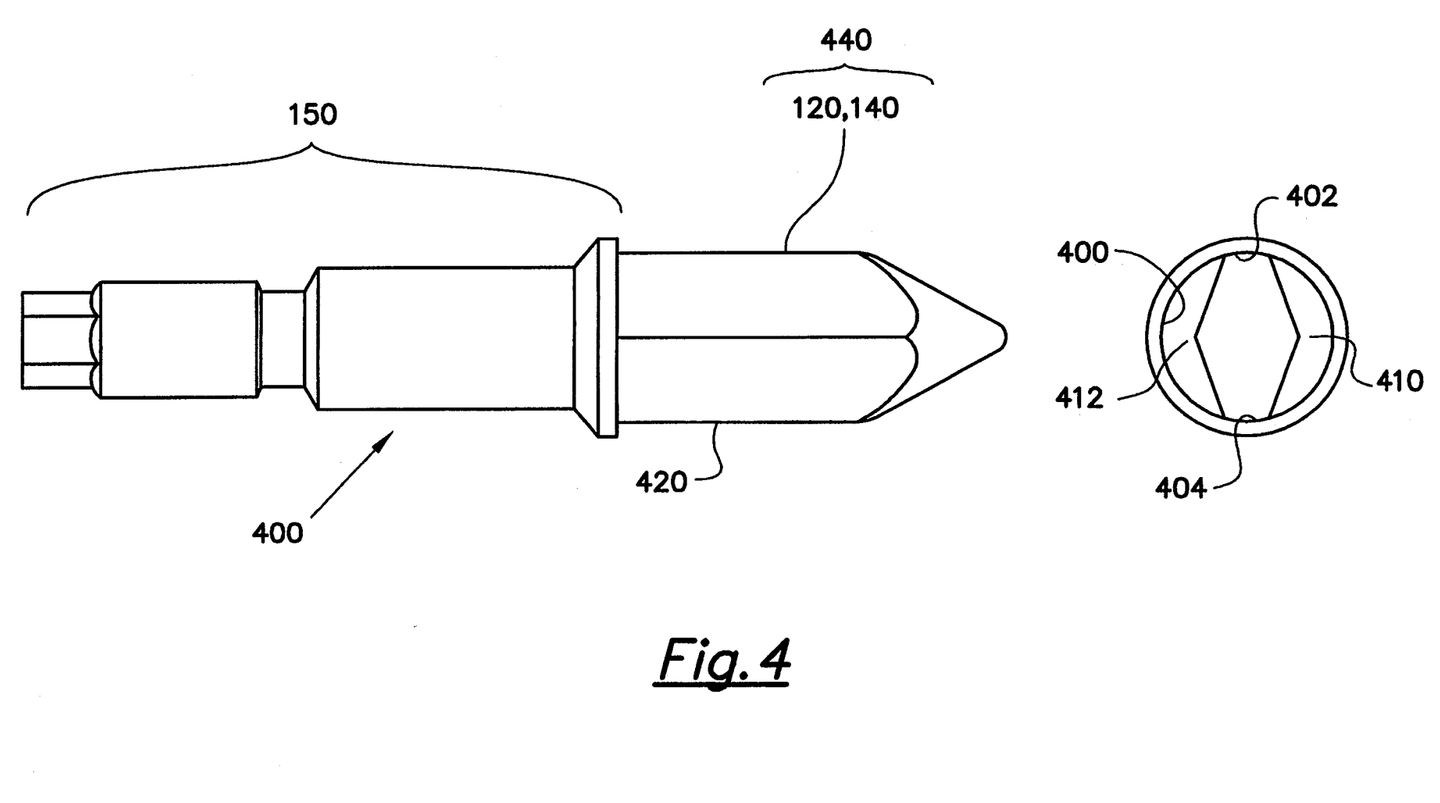
FIG. 4 is a diagrammatic view of a diamond shaped cylindrical alignment pin member.

In the preferred embodiment of the invention, frame alignment pin members 120 and 140 are intended to be diamond-shaped cylindrical alignment pins as particularly illustrated in FIG. 4. The alignment pin 400 illustrated therein is sometimes referred to as a modified diamond shaped pin, well known in the art. In one embodiment of the invention, the pins are approximately 0.5 inches in diameter and having an extension, portion 440, of 1.3 inches away from the support frame. The diamond-shaped cylindrical alignment pins may generally have diametrically opposed round portions 402 and 404 for making contact with a mating bushing, whereas the diamond points 410 and 412 are such as to be less than the radius of the round portion and therefore will not make any contact with a round bushing. The stud portion 450 of alignment pins 400 are intended to be rigidly fixed to the support frame by a variety of techniques including welding, threading, and the like.

In contrast, alignment pin member 130 is intended to be a round alignment pin of a selected diameter, for example the same diameter as the diamond-shaped cylindrical alignment pin 400. Alignment pin member 130 is also rigidly secured to support frame 100, similar to pin 400.

Inertial Sensor Chassis

FIG. 2 illustrates a front-face isometric bottom view of chassis 150, and FIG. 3 illustrates a near-face isometric bottom view of chassis 150 to provide a clearer understanding of the present invention. Chassis 150 includes one or more inertial assemblies (not shown) secured to chassis 150 and having known orientation relative to the chassis as already described.

Referring now to FIGS. 2 and 3, the rear face 150R of chassis 150 include alignment pin receiving means illustrated as chassis bosses 152 and 162 including press fit bushings 154 and 164 respectively. The front side 150F of chassis 150 includes three chassis mounting members illustrated as lugs or ear like members 170, 180, and 190.

Lugs 170 and 190 provide a mechanization for precision yaw alignment as will be further described. Each lug, 170 and 190, includes a chassis planar mounting surface, 172 and 192, respectively. Lugs 170 and 190 include apertures 174 and 194 through the planar mounting surfaces 172 and 192, respectively, for receiving mounting bolts 210 and 212 respectively. Lug 180, as will be described provides, in part, a mechanization for the establishment of the pitch-roll plane. Lug 180 includes an aperture 182 for retaining a press fit bushing 184.

Pitch Roll Alignment

In the present invention, the position of bushings 154, 164, and 184, and chassis planar mounting surfaces 172 and 192 on chassis 150 are configured such that frame alignment pin members 120, 130, and 140 mate with bushings 154, 164, and 184, respectively; and, at the same time, chassis planar mounting surfaces 172 and 192 make planar contact with frame planar mounting surfaces 110 and 112, respectively. Therefore, when the alignment pin members are coarsely inserted into their corresponding bushings, the chassis may then be pushed against the alignment pin members until planar contact is made between the chassis planar mounting surfaces and the frame planar mounting surfaces. As will be more fully described with references to FIGS. 5a, 5b and 5c, planar contact of the mating surfaces as aforesaid establishes rigid yaw alignment between the support frame 100 and the chassis 150, and the three frame alignment pin members 120, 130, and 140 establish a roll-pitch alignment plane.

Figure 5A:
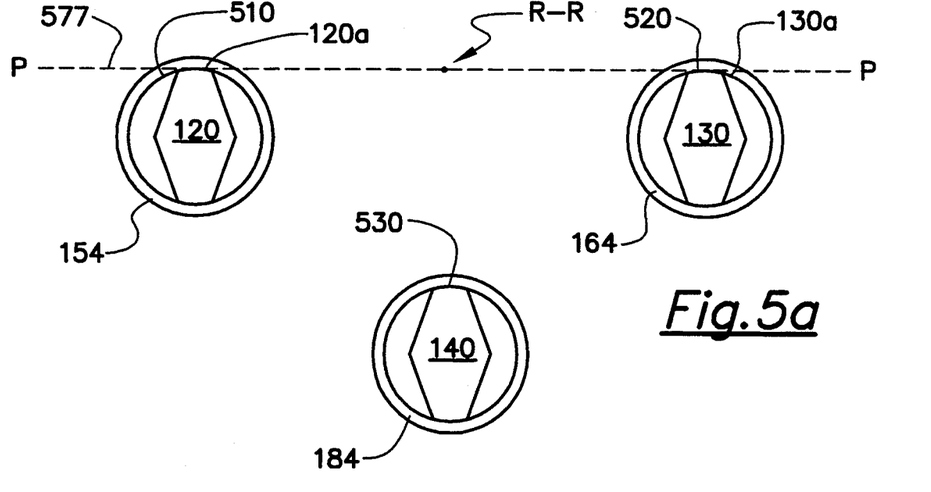
FIGS. 5a, 5b, and 5c are front, side, and top views of the arrangement of the alignment pin members and corresponding bushing of the mounting system illustrated in FIGS. 2 and 3.

Referring now to FIG. 5a, thereshown is a diagrammatic view showing alignment pin members 120, 130, and 140 projected away from the support frame toward the viewer. Datum line P—P, representing the pitch axis, is shown projected through the uppermost round top portion 120a of diamond shaped cylindrical alignment pin member 120 and the uppermost round top portion 130a of round alignment pin member 130. If alignment pin members 120 and 130 are perfectly parallel to each other, then the uppermost longitudinal surfaces of top portions 120a and 130a would lie in a reference plane identified as plane 577 (perpendicular to the drawing plane). However, due to some misalignment, there will exist at least a point at which the upper cylindrical surface of the diamond shaped cylindrical alignment pin 120 contacts bushing 154, e.g., point 510; and there exists at least a point at which the upper cylindrical surface of the round shaped alignment pin member 130 contacts bushing 164, e.g., point 520. For a similar reason, there exists at least a point at which the upper cylindrical surface of the diamond shaped cylindrical alignment pin member 140 contacts bushing 184, e.g., point 530.

Datum line P—P defines, therefore, a reference axis in parallel with the pitch axis of the chassis relative to the support frame. As can be seen in FIG. 5a, alignment pin member 120 is diamond shaped to provide for tolerance buildup between the bushings 154 and 164 and the alignment pin members 120 and 130. That is, when the chassis is inserted onto the support frame the round alignment pin member 130 becomes the primary alignment pin, and greater "play" is allowed to move along the data line P—P by virtue of the diamond shaped cylindrical alignment pin member 120. Further, the use of the diamond-shaped cylindrical alignment pin member 120 also allows for variations in the degree which alignment pin members 120 and 130 are in parallel.

Figure 5B:
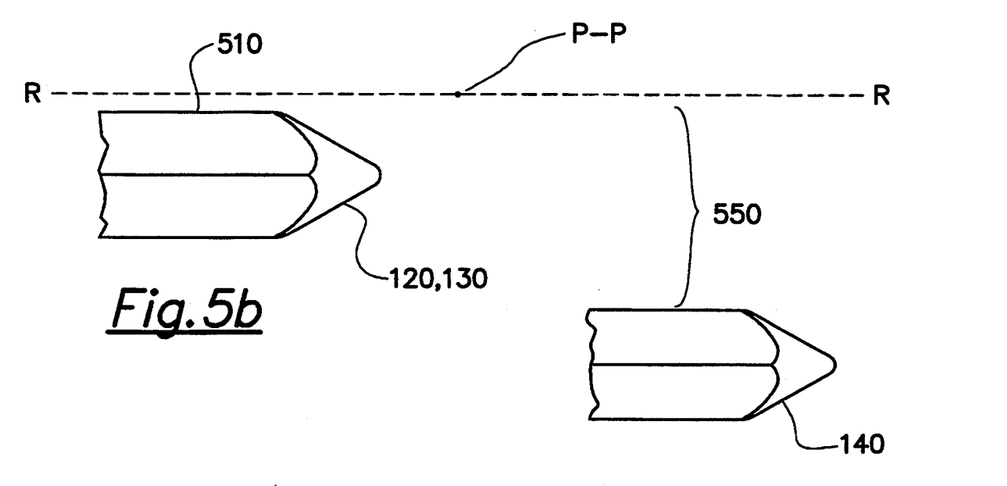

FIG. 5b is a diagrammatic view illustrating the location of the alignment pins from a side view thereof. If alignment pins 120 and 130 are perfectly parallel, the side view will only show a single pin view. Further, the uppermost longitudinal surface of pins 120 and 130 define a reference roll plane (not shown) having a reference axis R—R, lying therein, in parallel with the roll axis. Alignment pin member 140 is illustrated to be shown as in parallel with alignment pin members 120 and 130 but offset (550) from the reference axis R—R. Disregarding the offset of pin 140, axes R—R and P—P establish a "roll-pitch" reference plane (perpendicular to the drawing plane in FIG. 5b).

Figure 5C:
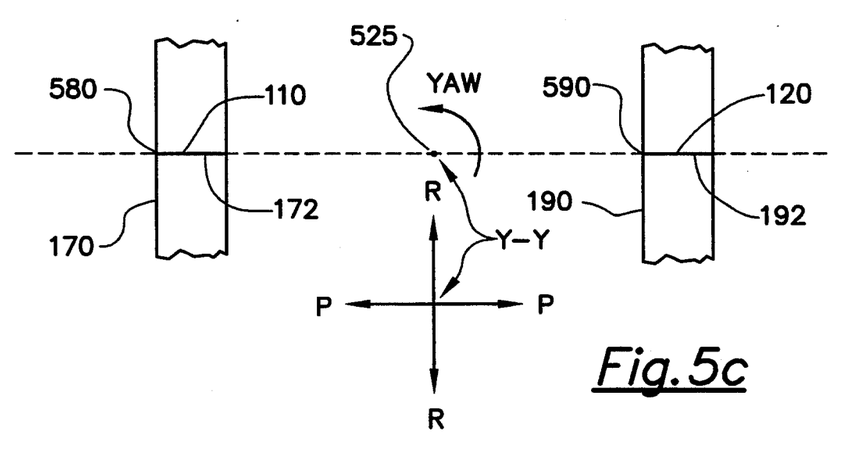

FIG. 5c illustrates the planar contacts between frame planar mounting surface 110 and corresponding chassis planar mounting contact surface 172, designated as surface contact 580, and between frame planar mounting surface 112 and corresponding chassis planar mounting surface 192, designated as surface contact 590. The planar contact surfaces in the preferred embodiment of the invention are in parallel with the yaw reference axis 525. As can be seen in FIG. 5c, the yaw alignment is held precisely by the two planar contact surfaces 580 and 590.

It should be noted, however, that the two contact surfaces 580 and 590 need not be either coplanar or parallel, but must be in non-parallel alignment with the roll axis in order to achieve precision yaw alignment in accordance with the teachings of the present invention. In the preferred embodiment of the invention, these contact surfaces are preferably parallel with a reference yaw axis, and secondarily in parallel with the pitch axis as particularly illustrated in FIG. 5c.

It should be noted that the distance between the two rear alignment pin members 120 and 130 and the distance between the two mating bushing 154 and 164 have manufacturing tolerances. Therefore, the clearance between the pin diameter and bushing diameter is necessary to avoid the possibility of interference and the result of not being able to install the chassis onto the support frame. Of course, this situation is considered and improved by use of the "diamond shaped" alignment pin member 120. However, the use of the modified diamond shaped alignment pin member 400 having the rounded portions reduces the effectiveness of the diamond shaped pin. Therefore, to allow for manufacturing tolerances, the pins generally are smaller than the bushings. Herein, a modified diamond shaped pin, i.e. having round portions, and a pure diamond shaped pin, and the like, are interchangeable, and all within the spirit and scope of the present invention.

Figure 6A:
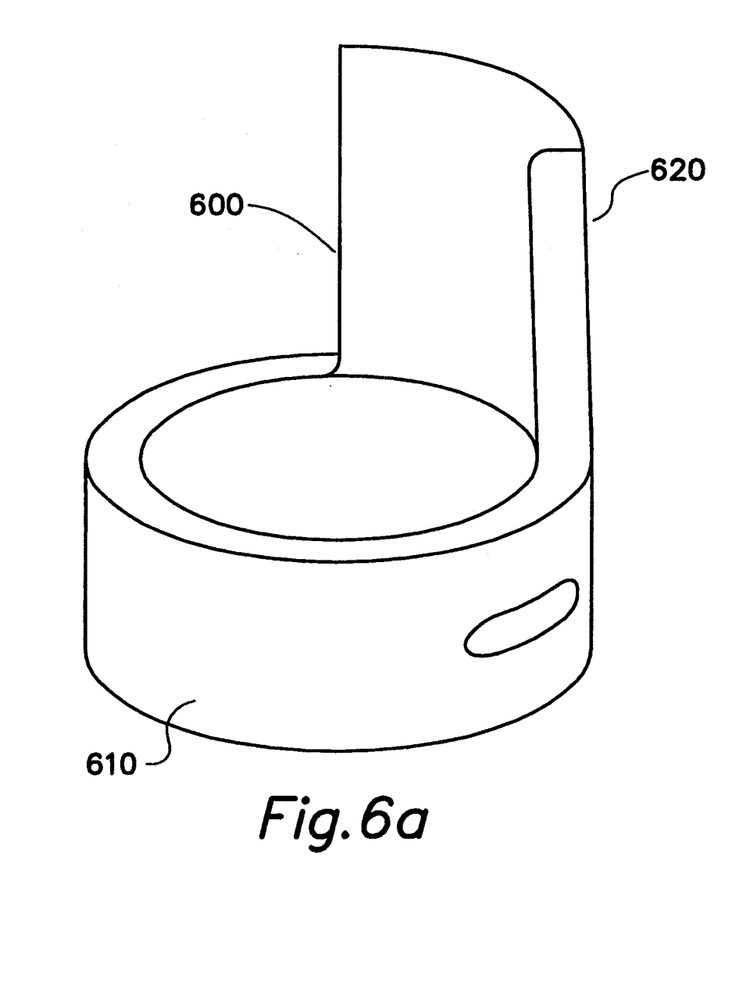
FIGS. 6a and 6b are an isometric view and cross-sectional view, respectively, of a preload bushing.
Figure 6B:
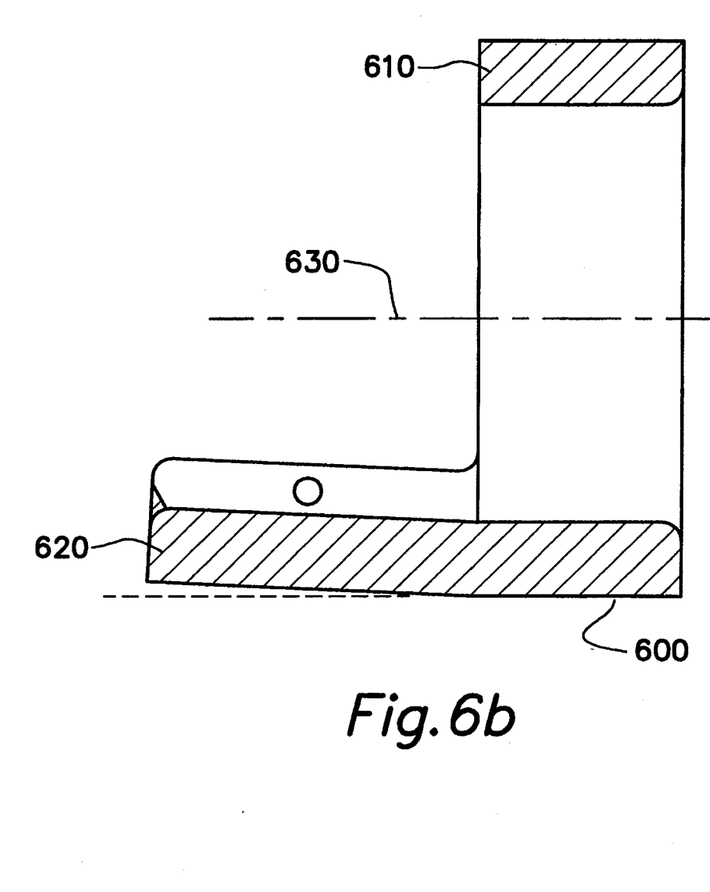

FIG. 6 illustrates the preferred embodiment for bushings 154 and 164, designated as numeral 600 in FIG. 6. Bushings 600 includes a cylindrical portion 610 and a projecting shank 620. Shank 620 is essentially the extension of the cylindrical portion 610 having a substantial portion of the cylindrical part removed. Shank 620 forms a tang which is formed by bending shank 620 toward the cylindrical bushing axis 630. Bushing 600 is intended to be made from a hard metal, for example steel or the like, so that tang 620 serves to provide a spring force in a manner as will now be described.

Preloaded bushings formed in a manner in accordance with FIG. 6 or the like are intended to serve as bushings 154 and 164. The chassis bosses 152 and 162 with corresponding bushings 154 an 164 serve to provide precise positioning of the rear of the chassis onto the two rear alignment pin members 120 and 130 of the aircraft support frame 100. These rear preloaded bushings should be made of a harder and more durable material than the chassis in order to maintain a precise fit with the alignment pin members. These preload bushings 600 also provide spring support as an integral design of the bushing which holds the chassis in position during vibration.

When the chassis bushings 154 and 164 are forced to mate with the alignment pin members, the bushings in the chassis rest, by gravity, on the top portion of the frame alignment pin members so that the top of the inside diameter of the bushings contact the top of the cylindrical portion of the alignment pin members 120 and 130. Further, the preload bushing tang or spring pushes up on the bottom of the cylinder portion of the frame alignment pin members 120 and 130. This spring or preload bushing tang is intended to be strong enough to force the top portion of the alignment pin members 120 and 130 against the top portion of the bushings 154 and 164 even during vibration. Therefore, the preload bushings prevent any relative motion between the rear bushings and the rear alignment pins.

After the bushings have mated with the frame alignment pin members, the chassis essentially hangs on the top surfaces of the alignment pin members. Afterwards, the chassis is rigidly mounted to the support frame through a mounting means provided by mounting bolts 210 and 212. The mounting bolts 210 and 212 passing through apertures 174 and 194, respectively, being threaded onto studs 116 and 118 of support frame 100.

The mounting system in accordance with the present invention provides an accurate and repeatable alignment of a chassis relative to a support frame, particularly applicable for an aircraft support frame. By way of the lug bolts 210 and 212 which rigidly fixes the chassis planar mounting surfaces 172 and 192 against the frame planar mounting surfaces 110 and 112, respectively, the yaw alignment of the chassis is held tightly. Since in the present invention the three alignment pins are not utilized for yaw alignment, the clearance between the pin diameter and bushing diameter does not detract from yaw alignment. Therefore this clearance may be increased to as large as necessary to insure that the chassis may always be installed on the aircraft shelf or support frame even with accounting for manufacturing tolerances.

Although not shown, improved pitch alignment may be provided by an additional pitch alignment planar mounting surface between the top of the support frame and the bottom of the chassis, for example, located just below the front mounting pin 140. In this situation, the front mounting pin would not be used for precise pitch alignment, but could be retained for a course guide as long as the clearances were large enough to allow the alignment to be controlled by the pitch alignment planar mounting surfaces of the support frame and chassis.

Although the present invention has been described with reference to the preferred embodiments, workers skilled in the art will recognize that changes may be made in form and detail without departing from the spirit and scope of the present invention.

More specifically, it should be recognized by those skilled in the art that the function of the alignment pin members, forming in part the support frame 100, and the mating bushings of chassis 150 may be interchanged (not shown). In this situation, the alignment pin members of the chassis would be sustained by the bottom portion of the bushings of the support frame, in contrast to the situation of the preferred embodiment in which the chassis is supported by the top portions of the alignment pin members.

Further, although the preferred embodiment of the invention illustrated in FIG. 2 is such that the support frame planar mounting surfaces 110 and 112 are co-planar and substantially perpendicular to the alignment pin members, other embodiments are within the spirit and scope of the present invention. More specifically, the frame planar mounting surfaces 110 and 112 need not be co-planar nor parallel. More specifically, they may be placed at angles relative to the projection of the alignment pin members. All that is specifically required is that the frame planar mounting surfaces 110 and 112 be planar and substantially in non-parallel alignment with the longitudinal axis of the alignment pins of the support frame, i.e., the roll axis of the aircraft as illustrated in the drawings. Of course, the definition of the alignment axes relative to the aircraft depends upon the chassis-shelf-aircraft relationship, and all such relationships are intended to be within the spirit and scope of the present invention.

The embodiments of an invention in which an exclusive property or right is claimed are defined as follows:

1. An inertial sensor chassis mounting system comprising:
   a support frame having associated therewith first, second, and third mutually orthogonal reference axes, said support frame including,
   at least first and second frame mounting members each having a frame planar mounting surface being in non-parallel alignment with said second reference axis,
   a first frame alignment pin member extending from a first point in common with said support frame and extending in a direction substantially in parallel with said second reference axis,
   a second frame alignment pin member extending from a second point in common with said support frame and extending in a direction substantially in parallel with said second reference axis, and
   a third frame alignment pin member extending from a third point in common with said support frame and extending in a direction substantially in parallel with said second reference axis, said first, second, and third points defining a plane exclusive of a plane perpendicular to said second reference axis; and
   said inertial sensor chassis including,
   first and second chassis mounting members each having a chassis planar mounting surface,
   first, second, and third alignment pin receiving means structurally configured for mating with said first, second, and third frame alignment pin members, respectively,
   said first, second, and third alignment pin receiving means and said first and second chassis mounting members are located relative to each other such that said chassis planar mounting surface of each of said first and second chassis mounting members is capable of being in planar contact with said frame planar mounting surface of said first and second frame mounting members, respectively, and concurrently said first, second, and third alignment pin members mate with said first, second, and third alignment pin receiving means, respectively,
   first means for rigidly fixing said chassis planar mounting surface of said first chassis mounting member against said frame planar mounting surface of said first frame mounting member, and
   second means for rigidly fixing said chassis planar mounting surface of said second chassis mounting member against said frame planar mounting surface of said second frame mounting member.

2. The inertial sensor chassis mounting system of claim 1 wherein said frame planar mounting surface of each of said first and second frame mounting members is perpendicular to a plane defined by said second and third reference axes.

3. The inertial sensor chassis mounting system of claim 1 wherein said frame planar mounting surface of each of said first and second frame mounting members is in parallel with said third reference axis.

4. The inertial sensor chassis mounting system of claim 3 wherein said frame planar mounting surface of said first frame mounting member is co-planar with said frame planar mounting surface of said second frame mounting member.

5. The inertial sensor chassis mounting system of claim 1 wherein said first alignment pin is a round cylindrically shaped pin.

6. The inertial sensor chassis mounting system of claim 5 wherein said second and third alignment pins are diamond shaped cylindrical pins.

7. The inertial sensor chassis mounting system of claim 1 wherein each of said first, second, and third pin receiving means includes a brushing.

8. The inertial sensor chassis mounting system of claim 7 wherein said bushing associated with each of said first and second alignment pin receiving means includes means for providing a spring force against said mating alignment pin substantially perpendicular to the plane defined by said second and third reference axes.

9. The inertial sensor chassis mounting system of claim 1 wherein said frame planar mounting surface of said first and second frame mounting members are parallel with each other.

10. The inertial sensor chassis mounting system of claim 1 wherein said support frame is rigidly mounted to an aircraft and said first axis is defined as the yaw alignment axis of the aircraft.

11. An inertial sensor chassis having means for mounting to a support frame having associated therewith first, second, and third mutually orthogonal reference axes, said support frame includes, (i) at least first and second frame mounting members each having a frame planar mounting surface being in non-parallel alignment with said second reference axis, (ii) a first frame alignment pin member extending from a first point in common with said support frame and extending in a direction substantially in parallel with said second reference axis, (iii) a second frame alignment pin member extending from a second point in common with said support frame and extending in a direction substantially in parallel with said second reference axis, and (iv) a third frame alignment pin member extending from a third point in common with said support frame and extending in a direction substantially in parallel with said second reference axis, said first, second, and third points defining a plane exclusive of a plane perpendicular to said second reference axis, the inertial sensor chassis comprising:

first and second chassis mounting members each having a chassis planar mounting surface;

first, second, and third alignment pin receiving means structurally configured for mating with said first, second, and third frame alignment pin members, respectively;

said first, second, and third alignment pin receiving means and said first and second chassis mounting members are located relative to each other such that said chassis planar mounting surface of each of said first and second chassis mounting members is capable of being in planar contact with said frame planar mounting surface of said first and second frame mounting members, respectively, and concurrently said first, second, and third alignment pin members mate with said first, second, and third alignment pin receiving means, respectively;

first means for rigidly fixing said chassis planar mounting surface of said first chassis mounting member against said frame planar mounting surface of said first frame mounting member; and second means for rigidly fixing said chassis planar mounting surface of said second chassis mounting member against said frame planar mounting surface of said second frame mounting member.

12. The inertial sensor chassis mounting system of claim 11 wherein said frame planar mounting surface of each of said first and second frame mounting members is perpendicular to a plane defined by said second and third reference axes.

13. The inertial sensor chassis mounting system of claim 12 wherein said frame planar mounting surface of each of said first and second frame mounting members is in parallel with said third reference axis.

14. The inertial sensor chassis mounting system of claim 13 wherein said frame planar mounting surface of said first frame mounting member is co-planar with said frame planar mounting surface of said second frame mounting member.

15. The inertial sensor chassis mounting system of claim 11 wherein said first alignment pin is a round cylindrically shaped pin.

16. The inertial sensor chassis mounting system of claim 15 wherein said second and third alignment pins are diamond shaped cylindrical pins.

17. The inertial sensor chassis mounting system of claim 11 wherein each of said first, second, and third pin receiving means includes a bushing.

18. The inertial sensor chassis mounting system of claim 17 wherein said bushing associated with each of said first and second alignment pin receiving means includes means for providing a spring force against said mating alignment pin substantially perpendicular to the plane defined by said second and third reference axes.

19. The inertial sensor chassis mounting system of claim 11 wherein said frame planar mounting surface of said first and second frame mounting members are parallel with each other.

20. The inertial sensor chassis mounting system of claim 11 wherein said support frame is rigidly mounted to an aircraft and said first axis is defined as the yaw alignment axis of the aircraft.

21. An inertial sensor chassis mounting system comprising:

a support frame including,
first and second frame mounting members each having a frame planar mounting surface in non-parallel alignment with a first axis, and
three alignment pin members extending from said support frame in parallel with said first axis, said alignment pin members establishing a first reference plane;

a chassis including,
first and second chassis mounting members each having a chassis planar mounting surface,
three alignment pin receiving means configured for mating with said three alignment pin members, and
said first and second chassis mounting members and said three alignment pin receiving means being spatially related such that said first and second frame planar mounting surfaces are in substantial planar contact with said chassis planar mounting surfaces concurrently with said three alignment pin members mating with said three alignment pin receiving means; and means for rigidly fixing said chassis planar mounting surfaces against said support frame planar mounting surfaces.

22. An inertial sensor chassis mounting system comprising:

a support frame including,
first and second frame mounting members each having a frame planar mounting surface in non-parallel alignment with a first axis, and
three alignment pin receiving means configured for mating with three alignment pin members;

a chassis including,
first and second chassis mounting members each having a chassis planar mounting surface,
said three alignment pin members extending from said chassis in parallel with a first axis, said alignment pin members establishing a first reference plane, and
said first and second chassis mounting members and said three alignment pin members being spatially related such that said first and second frame planar mounting surfaces are in substantial planar contact with said chassis planar mounting surfaces concurrently with said three alignment pin members mating with said three alignment pin receiving means; and means for rigidly fixing said chassis planar mounting surfaces against said support frame planar mounting surfaces.

23. The inertial sensor chassis mounting system of claim 1 wherein said planar surface of said first and second frame mounting members are on opposite sides of a plane defined by said third frame alignment pin member and said third reference axis.

* * * * *

UNITED STATES PATENT AND TRADEMARK OFFICE
CERTIFICATE OF CORRECTION

PATENT NO. : 5,360,236
DATED     : November 1, 1994
INVENTOR(S) : Harry R. Brown It is certified that error appears in the above-indentified patent and that said Letters Patent is hereby corrected as shown below:

Column 10, line 58, cancel "brushing" and substitute "bushing".

Signed and Sealed this

Seventh Day of February, 1995

Attest:

BRUCE LEHMAN

*Attesting Officer*    Commissioner of Patents and Trademarks